United States Patent
Heathcote et al.

(10) Patent No.: US 8,276,605 B2
(45) Date of Patent: Oct. 2, 2012

(54) DEVICE FOR CLEANING A FILTER ELEMENT

(75) Inventors: Warwick Heathcote, Brendale (AU); Jeremy Smith, Brendale (AU)

(73) Assignee: Pool Systems Pty Ltd., Brendale, Queensland (AU)

( * ) Notice: Subject to any disclaimer, the term of this patent is extended or adjusted under 35 U.S.C. 154(b) by 554 days.

(21) Appl. No.: 11/913,283

(22) PCT Filed: May 2, 2006

(86) PCT No.: PCT/AU2006/000572
§ 371 (c)(1),
(2), (4) Date: Sep. 25, 2008

(87) PCT Pub. No.: WO2006/116810
PCT Pub. Date: Nov. 9, 2006

(65) Prior Publication Data
US 2009/0056753 A1    Mar. 5, 2009

(30) Foreign Application Priority Data
May 3, 2005    (AU) .................................. 2005902237

(51) Int. Cl.
*B08B 11/00* (2006.01)
*B08B 3/02* (2006.01)
*B08B 1/00* (2006.01)
(52) U.S. Cl. ........ 134/172; 134/182; 134/199; 134/900; 401/289; 210/791; 239/288.3

(58) Field of Classification Search ................ 134/6, 26, 134/34, 182, 900, 199, 152, 172; 210/791; 401/289, 270; 239/288, 288.3, 530
See application file for complete search history.

(56) References Cited

U.S. PATENT DOCUMENTS

| | | | |
|---|---|---|---|
| 3,563,474 A * | 2/1971 | Robinson ...................... 239/561 |
| 4,709,717 A | 12/1987 | Rannigan et al. |
| 4,836,702 A * | 6/1989 | Allen .............................. 401/10 |
| 5,292,074 A | 3/1994 | Clark et al. |
| 5,381,964 A | 1/1995 | Reyna |
| 5,409,027 A * | 4/1995 | Glunt ............................ 134/138 |
| 6,463,943 B1 | 10/2002 | Monroe |
| 6,715,501 B2 * | 4/2004 | Pociask ........................ 134/138 |
| 2003/0033688 A1 * | 2/2003 | McMahon ....................... 15/405 |
| 2004/0047675 A1 * | 3/2004 | Bonelli et al. ................ 401/289 |
| 2004/0262427 A1 * | 12/2004 | Byron ......................... 239/288 |
| 2006/0060544 A1 * | 3/2006 | Brooke ........................ 210/791 |

OTHER PUBLICATIONS

Supplementary European Search Report for parallel application No. PCT/AU2006000572, Supplementary ESR mailed on Nov. 3, 2009, 6 pages.
Examination Report for New Zealand parallel patent application No. 563348, Examination Report mailed on Aug. 6, 2009, 2 pages.

* cited by examiner

*Primary Examiner* — Alexander Markoff
(74) *Attorney, Agent, or Firm* — Michael A. Glenn; Glenn Patent Group

(57) ABSTRACT

A device (11) for cleaning a pleated filter element, the device having; a body, a fluid inlet (13), a work face (14) having at least one pleat separating projection (19) and at least one fluid outlet (22) for directing fluid between pleats separated thereby.

12 Claims, 2 Drawing Sheets

DEVICE FOR CLEANING A FILTER ELEMENT

The present invention relates to a device for cleaning a filter element of the type having a pleated filter surface. In particular, the device is for use with cleaning a filter element of a cartridge filter for a swimming pool or spa.

BACKGROUND OF THE INVENTION

The present invention will be described with particular reference to a filter element for use with a cartridge filter in a pool or spa filtration system. However, it will be appreciated that the device of the present invention may be used to clean any suitable filter element having a pleated filter surface and no limitation is intended thereby.

The conventional cartridge filter is generally comprised of a cylindrical filter element having one or more layers or sheets of a porous material configured with a pore size to allow the passage of water while trapping and removing the solid particles from the water that are unable to pass through the pores. As the filter traps more and more solid particles, the pores in the filter media become clogged, inhibiting the flow of water through the pool or spa's circulation system and thereby decreasing performance and possibly even damaging the circulation pump. In an attempt to address these concerns, the cartridge filters known in the art typically employ relatively large sheets of the porous filter material that are pleated so as to provide an increased filter surface area, thus increasing the life and performance of the filter, while not increasing the filter's overall size. The filter material is maintained in its cylindrical, pleated configuration by being mounted on a rigid cylindrical core and capped on each end by an annular end cap.

Cartridge filters however, become clogged with debris and experience decreased flow rates. Thus, the cartridge filter elements require regular cleaning. Most cartridge filter element manufacturers recommend cleaning the filter manually using a garden hose. This is time consuming and requires operator care to clean between the pleats. Filter cleaning devices are also available which have a spindle upon which a filter element to be cleaned is rotatably mounted. An operator directs a jet of water from the nozzle of a garden hose at an angle which causes the filter to spin. The centrifugal action of the spinning filter assists in dislodging debris. One problem with this approach is that it is usually messy, and the operator often gets splattered with water and debris. Another limitation of such method of cleaning filters is that the filter often spins so fast that the centrifugal force forces out the water before it penetrates deeply into the filter element, effectively cleaning only the outer surface.

It is therefore an object of the present invention to provide a device for cleaning a pleated filter element which may at least partially overcome the above disadvantages or provide the public with a real or commercial choice.

SUMMARY OF THE INVENTION

According to a first broad form of the invention there is provided a device for cleaning a pleated filter element, the device having;
 a body,
 a fluid inlet,
 a work face having at least one pleat separating projection and
 at least one fluid outlet for directing fluid between pleats separated thereby.

The fluid may be any suitable fluid which may be used to clean a particular filter element and can be gaseous or liquid. For use with a cartridge filter as used in spa or pool cartridge filters the fluid is typically water. In this case, the fluid inlet is typically adapted to be coupled to a garden hose.

The device includes at least one pleat separating projection. Typically, the device includes from three to ten pleat separating projections.

Typically, the work face and/or projections are shaped so as to present a curved face complimentary to the curvature of a filter element.

The fluid outlet(s) direct fluid into the space between separated pleats. Each pleat separating projection typically has an outlet associated therewith. The outlet may be located on the projection or on the work face. The fluid outlets are typically in the form of spray nozzles. The spray pattern of the nozzles is typically flat as to direct the flow of fluid onto the walls of the pleats.

Typically, the body includes a valve for controlling the flow of fluid. Preferably the valve is of barrel type.

According to a further embodiment of the present invention there is provided a method of cleaning a pleated filter element, the method including inserting at least one pleat separating projection between adjacent pleats so as to separate the pleats whilst directing a fluid between the separated pleats.

DETAILED DESCRIPTION OF THE FIGURES

Figure 1:
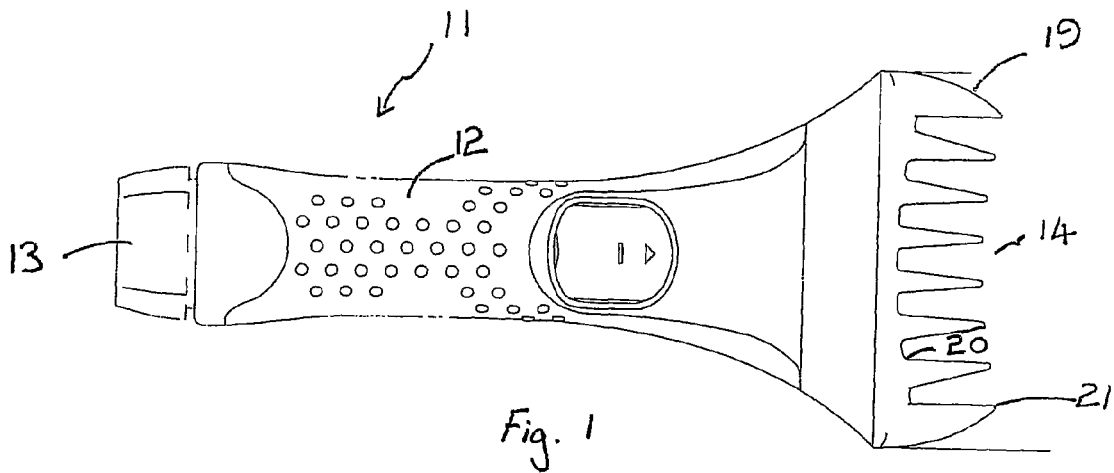
FIG. 1 shows a plan view of a preferred device of the present invention.
Figure 2:
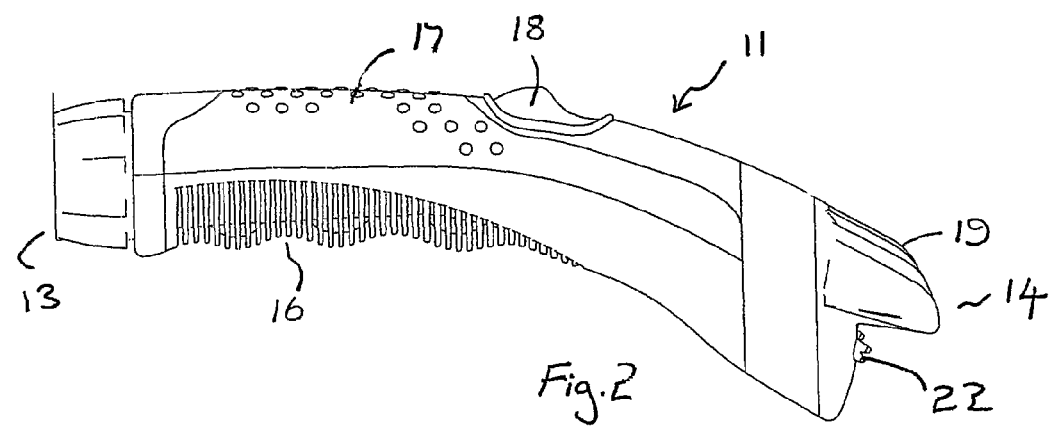
FIG. 2 shows a front view of the device of FIG. 1.
Figure 3:
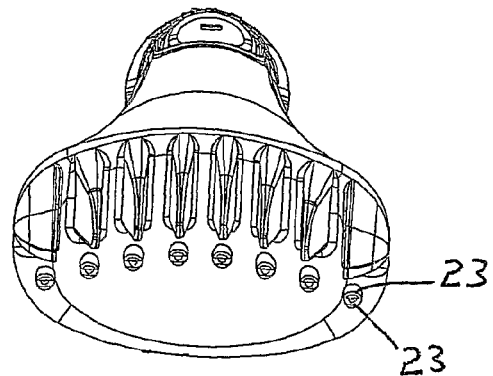
FIG. 3 shows a right view of the device of FIG. 1.
Figure 4:
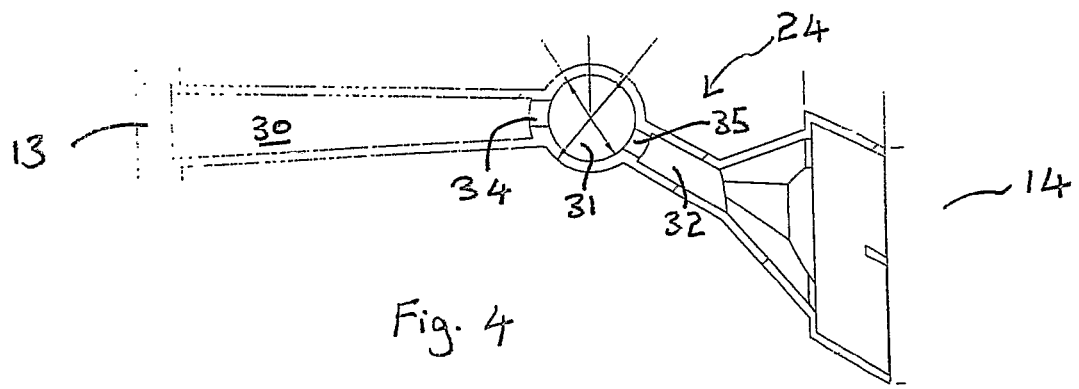
FIG. 4 is a cross section of part of the device of FIG. 2.

FIGS. 1 to 3 show a device 11 for cleaning a pleated filter element. The device has a body upon which an injection moulded handle portion 12 mounted, a fluid inlet 13 and a work face 14. The inlet 13 is designed to connect to a garden hose. The body is shown in FIG. 4. The handle portion 12 has a lower part 16 which is contoured so as to be able to be gripped comfortably by the fingers of an operator. The upper surface 17 has a trigger 18 for controlling the flow of water. Operation of the trigger 18 will be described in further detail below.

The work face 14 has 8 pleat separating projections 19. The projections are tapered from the base 20 to their leading edges 21. The tapered shape facilitates entry between the walls of the pleats. It can be seen from FIG. 1 that the leading edges 21 define a curve. This curve is complimentary to the curve of a filter element. Below each projection 19 is located a nozzle 22. Each nozzle has a horizontal slot which delivers a flat spray pattern. The present inventors have observed that such a spray pattern provides a more effective cleaning action than a cone spray pattern. The slot is defined by parallel lips 23 which assist in directing the spray pattern towards the interior of the pleat and also reduces splash back.

FIG. 4 is a cross section of body 24 of the device 11. The direction of water flow through the body from the inlet 13 to the work face 14 is directed through a first conduit 30, a cavity 31 which is circular in cross section and second series of conduits 32.

Figure 5:
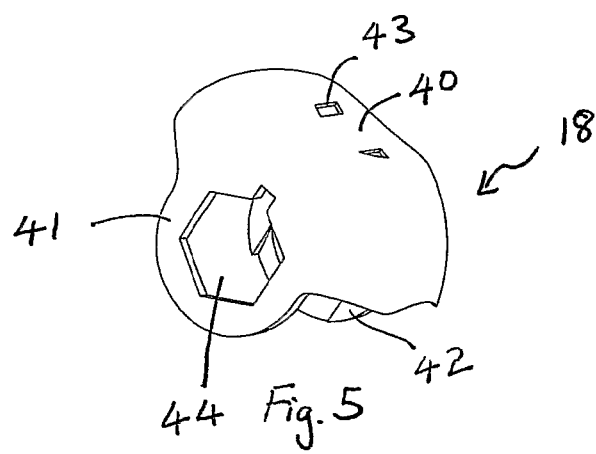
FIG. 5 is a perspective view of a trigger for a trigger assembly for used with the device of FIG. 1.
Figure 6:
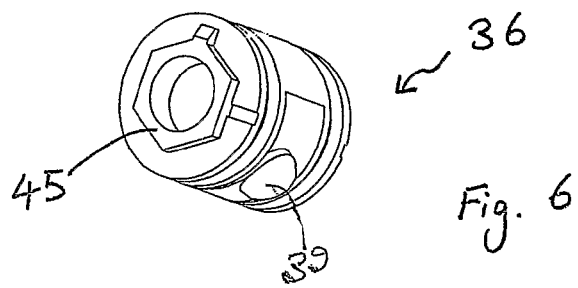
FIG. 6 is a perspective view of a barrel associated with the trigger assembly shown in FIG. 5
Figure 7:
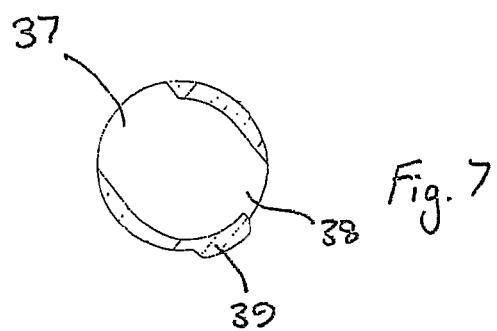
FIG. 7 is a front cross section of the barrel shown in FIG. 6.

The cavity 31 is associated with a trigger assembly. The cavity has an inlet 34 fluidly connected to the downstream end of the first conduit 30 and an outlet 35 fluidly connected to the upstream end of the second conduit 32. Further components of the trigger assembly which are not illustrated in FIG. 4 are the trigger 18 and barrel 36. These are shown in FIGS. 5 and 6 respectively. The barrel 36 has a cylindrical outer surface which allows it to be rotatably mounted within the cavity 31. The barrel has an inlet 37 and an outlet 38 which align with the respective inlet 34 and outlet 35 of the cavity. Adjacent the barrel outlet is a seal 39 to seal outlet 38. Turning now to the trigger as shown in FIG. 5, the trigger 18 has a top section 40 and two side sections 41, 42. The top section 40 has indicia 43 which indicates to a user whether the trigger 18 is in the off or on position. Each side section has a pentagonally shaped aperture 44. In use the trigger is placed over the housing of the cavity 31 and the apertures 44 mate with corresponding projections on the 45 on the barrel. In this way movement of the trigger 18 causes the barrel 36 to also move. Movement of the trigger 18 in a first direction causes seal 39 to seal outlet 35. Movement in the reverse direction moves the seal 39 to an open position such that water can flow though the outlet 35 and through to the work face 14.

It may be appreciated that use of a barrel type valve in this manner does not cause any blockage of the water flow when the trigger assembly is in the open position. This may be compared to other types of valves conventionally used in garden hose attachments, such as butterfly valves.

In use, an operator attaches a garden hose to inlet 13 and moves the trigger 18 to the on position. The operator then inserts the pleat separating projections between the pleats of a cartridge filter element and moves the device 11 in a downwards direction from the top to the bottom of the pleats. The procedure is then repeated on adjacent pleats. It may be seen that the combination of the pleat separates and water nozzles enables the interior walls of the pleats to be efficiently cleaned. Still further a number of pleats may be washed at the same time, thereby reducing the labour intensity of the operation.

It will be appreciated that various changes and modifications may be made to the present invention as described herein without departing from the spirit and scope thereof.

The invention claimed is:

1. A device for cleaning a pleated filter element, the device having;
   a body having a rear end, a forward end, a fluid inlet at the rear end and a work face at the forward end,
   a single row of at least two pleat separating projections for separating pleats by insertion of the projections between pleats, whereby the projections are spaced laterally across and extend from the work face in a direction forward from the body and each pleat separating projection has a base and a leading edge and each projection is tapered from the base towards the leading edge;
   at least two fluid outlets located in the work face,
   wherein each said fluid outlet is aligned with and located beneath each of said pleat separating projections such that each said fluid outlet is configured for directing fluid in a direction substantially parallel to the projection that each of said fluid outlet is located below and configured for directing fluid between pleats that are separated by insertion of the pleat separating projection between the pleats.

2. The device of claim 1 having from three to ten pleat separating projections.

3. The device of claim 1, wherein the leading edges of the projections define a curve complimentary to the shape of the element to be cleaned.

4. The device of claim 1, wherein each fluid outlet is a slot defined by parallel lips that sprays the fluid in a substantially flat spray pattern.

5. The device of claim 1, wherein the fluid is water.

6. The device of claim 1, wherein the fluid inlet is adapted for connection to a garden hose.

7. The device of claim 1, further including a trigger assembly having a trigger moveable between an open and a closed position.

8. The device of claim 7, wherein the trigger assembly includes a flow control valve.

9. The device of claim 8, wherein the valve is a barrel valve.

10. The device of claim 9 which includes a handle portion between the rear end and the work face, wherein the handle portion has a lower contoured finger gripping part and an upper part and the trigger is located on the upper part at a position in front of the finger gripping portion.

11. A device for cleaning a pleated filter element, the device having:
    a body having a front end and a rear end, a fluid inlet at the rear end a work face at the front end and a handle portion between the inlet and work face,
    at least three pleat separating projections spaced laterally across the work face and extending forwards from the body, whereby each pleat separating projection has a base adjacent the work face and a leading edge, each projection is tapered towards the leading edge and the leading edges define a curve complimentary to the shape of the element to be cleaned and
    a single row of at least three fluid outlets spaced laterally across the workface, each fluid outlet being spaced from and below a pleat separating projection such that each fluid outlet is configured for spraying fluid in a direction substantially parallel to the projection that each of said fluid outlet is located below and configured for directing fluid into the pleat is separated by the pleat separating projection located.

12. A device for cleaning a pleated filter element, the device having;
    a body having a rear end, a forward end, a fluid inlet at the rear end and a work face at the forward end,
    at least three pleat separating projections for separating pleats by insertion of the projections between pleats, whereby the projections are spaced laterally across and extend from the work face in a direction forward from the body and
    at least three fluid outlets located in the work face,
    wherein each said fluid outlet is aligned with and located beneath each of said pleat separating projections such that each said fluid outlet is configured for directing fluid in a direction substantially parallel to the projection that each of said fluid outlet is located below and configured for directing fluid between pleats that have been separated by insertion of the pleat separating projection between the pleats and each fluid outlet is a slot defined by parallel lips that sprays the fluid in a substantially flat spray pattern.

\* \* \* \* \*